United States Patent [19]

Berger et al.

[11] 4,006,253
[45] Feb. 1, 1977

[54] PROCESS FOR NPN RUMINANT FEED SUPPLEMENT

[75] Inventors: Kenneth L. Berger, Palo Alto; Ronald J. Amen, Saratoga; Jorge J. Nassar, Sunnyvale; William B. Benken, San Jose, all of Calif.

[73] Assignee: Syntex (U.S.A.) Inc., Palo Alto, Calif.

[22] Filed: Dec. 8, 1975

[21] Appl. No.: 638,718

[52] U.S. Cl. .............................. 426/69; 426/635; 426/658; 426/807

[51] Int. Cl.$^2$ .......................................... A23K 1/14

[58] Field of Search .......... 426/626, 640, 635, 636, 426/2, 69, 465, 506, 807, 658; 71/11, 25; 260/211.5 R, 211

[56] References Cited

UNITED STATES PATENTS

| 3,677,767 | 7/1972 | McNeff | 426/2 |
| 3,873,728 | 3/1975 | Moore | 426/2 |
| 3,873,734 | 3/1975 | Higgins et al. | 426/69 |

Primary Examiner—R. B. Penland
Attorney, Agent, or Firm—Alan M. Krubiner; William B. Walker

[57] ABSTRACT

An NPN ruminant feed supplement having a high percentage of chemically bound urea is prepared from cellulose commodities by an efficient process involving reaction with urea and a concentrated mineral acid.

13 Claims, No Drawings

PROCESS FOR NPN RUMINANT FEED SUPPLEMENT

BACKGROUND OF THE INVENTION

It is well known that ruminant animals (for example, cattle and sheep) have the unique ability to convert non-protein nitrogen (NPN) to animal protein. This is accomplished, to a large extent, by the action of the microbial flora in the rumen of the animal which degrades such non-protein nitrogen sources to ammonia, which is then converted to protein.

The most widely used non-protein nitrogen source in ruminant feeds has been urea. However there are major problems with the use of urea in ruminant feeds since enzymatic breakdown of urea to ammonia often occurs substantially faster than the microbial uptake of the liberated ammonia. The excess ammonia thus produced can reach toxic levels in the animal which may lead to severe disability or death and such excess ammonia is not utilized for protein synthesis resulting in an inefficient utilization of available nitrogen. Additionally, ruminant animals will noticeably discriminate against urea in feed.

As a result, much work has been done to control the rate at which urea is broken down in the rumen by physically mixing urea with various starch or other polysaccharide sources or molasses, or by combining it chemically with various monosaccharides, polysaccharides or polysaccharide degradation products to afford slow release urea formulations. See, for example the chapter entitled Nonprotein Nitrogen Supplements for Ruminants in M. Gutcho, "Feeds for Livestock, Poultry and Pets", Noyes Data Corp., (1973), U.S. Pat. Nos. 2,748,001, 3,677,767, 3,873,733 and 3,873,728 and Belgian Pat. No. 806,971.

In the latter two U.S. patents is described the acid catalyzed reaction of urea with partially degraded polysaccharides in the presence of acid (preferably about pH 5-6) to afford an NPN ruminant feed supplement. However, none of the prior art methods describes the preparation of an NPN ruminant feed supplement that can be economically produced on a large scale, competitive with current free urea feed formulations or natural protein feeds such as soybean meal; that contain a relatively high percentage of chemically bound, slowly releasable urea, relative to free urea; and that provide readily available carbohydrates from inexpensive sources.

BRIEF DESCRIPTION OF THE INVENTION

The present invention relates to a novel process for the preparation of NPN ruminant feed supplements. More particularly, the present invention relates to the preparation of ruminant feed supplements containing a high percentage of chemically bound urea, relative to free urea, which are prepared in a simple, commercially feasible, process from readily available cellulose commodities.

DETAILED DESCRIPTION OF THE INVENTION

The present invention relates to a novel process for the preparation of NPN ruminant feed supplements. More particularly the NPN ruminant feed supplements prepared by the process of the present invention contain a high percentage of urea which is chemically bound to a carbohydrate molecule. More particularly, the process of the present invention relates to the use of readily available cellulose commodities as starting materials and their conversion, by reaction with urea in the presence of a concentrated mineral acid, to afford a product substantially comprising urea chemically linked to monosaccharide sugars or reaction products thereof.

As described above, the prior art discloses physical mixtures of urea with polysaccharides, and chemically bound urea prepared by reaction with partially degraded polysaccharides in the presence of acid. However, in contradistinction, the process of the present invention involves, to a large extent, the essentially complete degradation of a specific polysaccharide, namely cellulose, to afford the monosaccharide, glucose, and the further reaction of the glucose, thus formed in situ, with urea to form "glucose-urea", i.e., the ureide N-$\beta$-glucopyranoside, which is described in U.S. Pat. No. 2,612,497. Concurrently, other components of the particular cellulose commodity, e.g., hemicellulose and pentosans, produce other hexose sugars and pentose sugars, which are believed to similarly react with urea. It is further likely that the pentose sugars also cyclize to form furfural which may then condense with urea to afford "furfural-urea", described in U.S. Pat. No. 3,736,146. As a result of the process of the present invention, there is formed a product consisting substantially of "glucose-urea" as well as smaller amounts of other hexose-ureas, furfural-urea and other materials such as minerals, lignin degradation products, and the like.

Additionally, the process of the present invention causes a high percentage of urea to be bound to the carbohydrate. Thus, based upon the monosaccharide potential from hydrolysis of the cellulose commodity, more than 50% of the theoretical amount of urea becomes chemically bound (assuming a 1:1 ratio of urea:sugar), thus being available in a slow-release form, and reducing the amount of free urea in the product to acceptable levels.

The process of the present invention may be more particularly described by reference to the following manipulative steps:

A cellulose commodity is first added to a mixture of a concentrated mineral acid and urea at a pH less than 1, thereby causing a substantial dissolution of the cellulose commodity therein, it is believed, by solvation effects of the strong acid.

This mixture is then diluted with water and heated at an elevated temperature to cause the hydrolysis of the cellulose (and other polysaccharides) and the chemical binding of urea to the monosaccharides and reaction products thereof formed by the hydrolysis.

Finally, after the desired amount of urea is chemically bound, the pH of the mixture is adjusted to between about 3 and 8 to afford the final product.

As starting cellulose commodities that may be used in the process of the present invention there may be mentioned a variety of readily available, inexpensive industrial and agricultural waste products such as, for example, soy hulls, rice hulls, peanut hulls, oat hulls, cottonseed hulls, wheat straw, oat straw, corn stalks, soybean hay, corn cobs, cottonseed trash, bagasse, molasses and fiber residue from starch, cane and beet sources, cow and horse manure, wood by-products such as chips, dust and paper, sewage, and the like. Preferred commodities are soy hulls, rice hulls, peanut hulls, oat hulls and cottonseed hulls. The mineral acids that may be employed include for example sulfuric acid, phosphoric acid, hydrochloric acid and mixtures thereof. As mentioned above a concentrated mineral acid at pH less than 1 must be used to ensure substantial solvation and dissolution of the cellulose portion of the starting commodity. For this purpose there may be mentioned, for example, sulfuric acid (70% w/w or greater), phosphoric acid (85% w/w or greater), and hydrochloric acid (35% w/w or greater). The choice of acid will be dictated to a certain extent by the desired content of, for example, sulfur or phosphorus, in the final product. The acid or acid mixture is utilized in a quantity so as to give a ratio of between about 0.5 and 1.5 g. of 100% acid to 1 g. of cellulose commodity.

A critical and unanticipated feature of the present process is that the cellulose commodity is added to concentrated mineral acid which contains urea. Prior art procedures for saccharide-urea reactions involve the use of mineral acids, but at substantially higher pH than that of the present process. For example, U.S. Pat. No. 3,873,733 describes the use of an acid at about pH 5–6. U.S. Pat. No. 3,677,767 describes the use of an acid at a pH between about 1.5 and 3.0, and it is stated therein that at pH values below 1.5 the breakdown or hydrolysis of urea is accelerated and such conditions are not advisable.

Surprisingly, it has been found in the present invention that the use of concentrated mineral acids at low pH, and in the presence of urea, affords superior results for the hydrolysis of the cellulose and the binding of the resulting sugars to the urea. In particular, it has been found that the presence of urea in the initial reaction mixture greatly retards charring of the sugar formed during the hydrolysis step, a phenomenon which normally occurs when sugars are treated with concentrated mineral acid. While the mechanism of this effect is not completely understood, it appears that the presence of urea in the initial reaction mixture moderates the evolution of heat from the hydrolysis to a remarkable degree, thereby practically eliminating charring as a problem.

In the present process, the cellulose commodity is added to a mixture of urea and the concentrated mineral acid. Normally, the cellulose commodity is added portionwise to allow for its solvation and extensive dissolution in the reaction mixture. An equimolar amount of urea, relative to the cellulose content of the commodity, will normally be employed in the present process, although an excess of urea may be utilized. The total quantity of urea employed will, of course, be reflected in the free urea content of the final product. The quantity of urea initially contained in the acid is between about 0.25 and 0.5 g., per gram of concentrated acid, preferably about 0.30 to 0.35 g/g acid.

After most of the cellulose commodity has been dissolved in the urea-acid mixture, small amounts of water are added, if necessary, to reduce the viscosity of the mixture and then the remainder of the cellulose commodity and urea is added.

In the next step, sufficient water is added to dilute the reaction mixture to a manageable viscosity and provide sufficient water to hydrolyze the cellulose. A dilution to approximately ½ of the original concentration is conveniently employed. Then, the resulting mixture is heated at an elevated temperature to hydrolyze the cellulose and other polysaccharides and cause the chemical reaction of the resulting sugars with urea. For this portion of the reaction a temperature of between about 140° and 220° F., preferably between about 170° and 190° F., is utilized. The heating is continued for a sufficient period of time to bind the desired degree of urea, which will preferably be greater than 50% of theoretical based upon potential monosaccharide, assuming a 1:1 ratio of monosaccharide:urea.

After the above step has been completed, the pH of the reaction mixture is adjusted to between about 3 and 8, most preferably between about 4 and 6. This may be accomplished by the addition of a suitable base to neutralize the mineral acid present. For example, bases such as calcium hydroxide, sodium hydroxide, potassium hydroxide, and the like may be employed. The use of sodium and potassium bases results in the formation of soluble salts whereas the use of, e.g., a calcium base, results in the formation (in the case of calcium sulfate and calcium phosphate) of an insoluble salt, which may then be separated from the product, if desired, by standard means such as centrifugation, filtration, and the like. The type of salt formed will thus dictate, to a certain extent, the salt content of the final product.

Alternatively, volatile acids such as hydrogen chloride, may be removed from the reaction mixture by e.g., evaporation or distillation to bring the pH of the resulting product within the desired range. This procedure avoids minimizes the formation of salts and will be preferable in those cases where an especially low salt content, (e.g., les than 8% w/w) measured by total ash, for the ruminant feed supplement is desired.

The crude product resulting from the pH adjustment step may be utilized as is, or by appropriate concentration or dilution if the form of an aqueous solution; or it may be dried by conventional methods to afford a solid material.

Either the solid or liquid supplement can be utilized separately, or preferably in admixture with other conventional ruminant feed components, for administration to the animal.

The products prepared by the process of the present invention have a binding of urea to theoretically available monosaccharide (assuming a 1:1 ratio) of at least 50% (as determined by resistance to urease), the remainder of the urea remaining as unbound; and in general have a protein equivalency on a dry basis from about 40% to greater than 100%. The products prepared by the present process having a low inorganic salt content, (i.e., less than about 8% w/w) as determined by total ash are palatable as determined by taste acceptance studies in sheep on a weight maintainance regimen, and do not cause toxicity problems which are characteristic of urea-containing supplements.

The present process may be performed on a large scale, suitable for commercial application, utilizing a single reaction vessel with a minimum of manipulative steps, and is conveniently performed as a batch process.

The following examples further describe the process of the present invention. These examples are given by way of illustration only and are not intended to restrict or limit the scope of the invention, as set forth hereinabove, in any manner.

EXAMPLE 1

18 Kg. of 93% (w/w) sulfuric acid were placed in a 30 gallon glass-lined Pfaudler reactor. Six kg. of urea were slowly added with mixing until dissolved. The temperature of the sulfuric acid-urea mix was controlled at 110°–120° F. Soy hulls were added at a rate of 5 kg. per hour until 15 kg. of the soy hulls had been introduced.

While stirring at 120° F., 2 × 3 kg. portions of water were added over a period of 15 to 20 minutes, followed by an additional 5 kg. of water. In a separate container, 2 kg. of urea was mixed with 5 kg. of water in a suspension and slowly added to the reaction mixture. Then, an additional 10 kg. of soy hulls were added portionwise at 2.5 kg. per hour. The temperature was then raised to 175°–185° F. and held for 24 hours. The reaction mixture was then cooled to below 100° F. and a 50% (w/w) slurry of calcium hydroxide was added to bring the pH to 3.8–4.0. The crude wet product was pumped out of the Pfaudler and roller dried to a ground powder.

Analysis of the dried material was as follows:

| Component | % (w/w) | |
|---|---|---|
| Nitrogen | 8.6 | (54% protein equivalent) |
| Bound Urea | 10.49 | |
| Unbound Urea | 4.89 | |
| Ammonia | 1.08 | |
| Sulfur | 8.30 | |
| Calcium | 8.18 | |

EXAMPLE 2

The crude wet product from Example 1, prior to roller drying, was diluted 3:1 with water and filtered through a filter press. The filtrate was evaporated to 61.5% solids and was analyzed on a wet basis:

| Component | % (w/w) | |
|---|---|---|
| Nitrogen | 12.60 | (78.8% protein equivalent) |
| Bound Urea | 50.00 | of total urea |
| Total Ash | 7.93 | |
| Calcium Sulfate | <7.00 | |
| Ammonia | 1.70 | |

EXAMPLE 3

To 90 G. of 93% (w/w) sulfuric acid was added 30 g. of urea, and then 80 g. of soy hulls were added in small portions with mixing followed by 20 ml. of water and additional soy hulls. After a total of 100 g. of soy hulls had been added, 90 g. of 85% (w/w) phosphoric acid was added. Additional soy hulls were added followed by 230 ml. of water and 13 g. of 36% (w/w) hydrochloric acid. After a total of 250 g. of soy hulls had been added, 55 g. of urea suspended in 50 ml. of water was added to the reaction mixture and the reaction mixture was heated at 190°–195° F. overnight. After cooling, 200 ml. of water was added and the product was neutralized with a mixture of calcium hydroxide and sodium hydroxide to a pH of about 4.30.

Analysis indicated that 66.6% of the added nitrogen, as urea, was urease resistant.

EXAMPLE 4

The procedure of Example 1 was repeated, utilizing the identical amount of rice hulls in place of soy hulls. The crude wet product was diluted 3:1 with water and filtered through a filter press. The filtrate was evaporated to 66% solids and was analyzed on a wet basis:

| Component | % (w/w) | |
|---|---|---|
| Nitrogen | 12.9 | (81% protein equivalent) |
| Bound Urea | 42.5 | |
| Total Ash | 9.0 | |
| Ammonia | 3.0 | |
| CaSO$_4$ | 7.8 | |

What is claimed is:

1. A process for the preparation of an NPN ruminant feed supplement, which process comprises:
   a. adding cellulose-containing commodity portionwise to a mixture of a concentrated mineral acid and urea said mixture having a pH less than 1, to cause a substantial dissolution of said cellulose containing commodity
   b. diluting the above mixture with water and heating at an elevated temperature for a period of time sufficient to cause the chemical binding of at least 50% of theoretical of the urea, based upon the monosaccharide potential of said cellulose-containing commodity and a 1:1 molar ratio of binding of urea to monosaccharide, and
   c. adjusting the pH of the mixture obtained in step (b) to between about 3 and 8.

2. The process of claim 1 wherein said cellulose commodity is selected from the group consisting of soy hulls, rice hulls, peanut hulls, oat hulls and cottonseed hulls.

3. The process of claim 1 wherein said mineral acid is selected from the group consisting of sulfuric acid, phosphoric acid and hydrochloric acid, and mixtures thereof.

4. The process of claim 1 wherein, in step (b), said elevated temperature is between about 140° and 220° F.

5. The process of claim 4 wherein said temperature is between about 170° and 190° F.

6. The process of claim 1 wherein, in step (c), said pH is between about 4 and 6.

7. The process of claim 1 wherein, in step (c), said pH adjustment is effected by the addition of calcium hydroxide.

8. The process of claim 1 wherein, in step (c), said pH adjustment is effected by the removal of a volatile acid.

9. The process of claim 1 wherein said feed supplement has a protein equivalency, on a dry basis, of at least 40%.

10. The process of claim 1 wherein a relatively water-insoluble salt is formed in step (c).

11. The process of claim 10 wherein said insoluble salt is selected from the group consisting of calcium sulfate and calcium phosphate.

12. The process of claim 10 wherein said insoluble salt formed is additionally separated from the remaining feed supplement.

13. The process of claim 1 wherein said feed supplement is additionally dried to afford a solid product.

* * * * *